United States Patent
Struthers

[11] Patent Number: 5,429,886
[45] Date of Patent: Jul. 4, 1995

[54] HYDROCARBON (HYDROGEN)/AIR AEROGEL CATALYZED CARBON ELECTRODE FUEL CELL SYSTEM

[76] Inventor: Ralph C. Struthers, 39503 Calle El Fuente, Saugus, Calif. 91350

[21] Appl. No.: 113,067

[22] Filed: Aug. 30, 1993

[51] Int. Cl.$^6$ .............................................. H01M 4/86
[52] U.S. Cl. ........................................ 429/44; 429/46
[58] Field of Search ................................... 429/44, 46

[56] References Cited

U.S. PATENT DOCUMENTS

| | | | |
|---|---|---|---|
| 3,575,718 | 4/1971 | Aplhart et al. | 429/46 |
| 3,719,528 | 3/1973 | Grasselli et al. | |
| 4,500,395 | 2/1985 | Nakamura | 429/44 |
| 4,623,415 | 11/1986 | Kahara et al. | 429/44 X |
| 4,659,559 | 4/1987 | Struthers | 429/46 |

Primary Examiner—Stephen Kalafut
Attorney, Agent, or Firm—Georges A. Maxwell

[57] ABSTRACT

A hydrocarbon (hydrogen)/air aerogel catalyzed carbon electrode fuel cell system comprising an acid electrolyte filled; steam hydrocarbon catalytic reformer with a heater and operating to receive and reduce hydrocarbons and water into a reformed gas of hydrogen and carbon dioxide gases; a centrifugal gas-separator device receiving reformed gas from the reformer and operating to separate the hydrogen and carbon dioxide gases of the reformed gas and delivering them separately; a fuel cell comprising a micro porous catalyzed-carbon aerogel anode electrode fed with hydrogen gas delivered by the gas separator, a micro porous catalyzed-carbon aerogel cathode electrode fed with oxygen from ambient air, and, a micro porous cation-filled silica hydrogel electrolyte separator between the anode and cathode electrodes; a hydrocarbon fuel supply delivering hydrocarbon fuel to the reformer; a combustion fuel supply selectively delivering hydrocarbon and hydrogen gas to the heater; and, a water supply receiving water produced in the fuel cell by fuel cell reaction and delivering it to the reformer.

10 Claims, 2 Drawing Sheets

FIG. 2

GASOLINE (HYDROGEN) / AIR FUEL CELL SYSTEM

STEAM-HYDROCARBON REFORMER: GASOLINE ($C_8H_{18}$)

$$C_8H_{18} + 16\ H_2O \longrightarrow 8\ CO_2 + 25\ H_2$$

1 GAL. + 2.53 GAL. --> 20.35 LBS. + 2.89 LBS.

CENTRIFUGAL FORCE GAS SEPARATOR:

$$8\ CO_2 + 25\ H_2 \begin{array}{l} \longrightarrow 25\ H_2 \text{(HYDROGEN GAS TO ANODE)} \\ \longrightarrow 8\ CO_2 \text{(CARBON DIOXIDE GAS TO WASTE)} \end{array}$$

ANODE:

$$25\ H_2 \longrightarrow 50\ H^+ + 50\ \varepsilon^-$$

CATHODE:

$$25/2\ O_2 + 50\ H^+ + 50\ \varepsilon^- \longrightarrow 25\ H_2O$$

CELL NET:

$$25\ H_2 + 25/2\ O_2 \longrightarrow 25\ H_2O$$

SYSTEM NET:

$$C_8H_{18} + 25/2\ O_2 \longrightarrow 8\ CO_2 + 9\ H_2O$$

1 GAL. + 23 LBS. --> 20.35 LBS. + 1.42 GAL. (TO WASTE)

FIG. 3

COMPUTATION OF GASOLINE (HYDROGEN) / AIR FUEL CELL EFFICIENCY

ONE (1) GALLON OF GASOLINE REFORMED INTO 2.89 LBS. OF HYDROGEN GAS:

WATT HOURS = (56,691)(.00116)(2.89*454)/2 = 43,241.90 @ 100% EFF.

WATT HOURS (2.89 LBS. $H_2$) = (43,241.97*.80) = 34,593.6 @ 80% EFF.

WATT HOURS (2.89 LBS. $H_2$) = (43,241.97*.60) = 25,945.2 @ 60% EFF.

WATT HOURS (2.89 LBS. $H_2$) = (43,241.97*.40) = 17,296.8 @ 40% EFF.

100% EFFICIENT GASOLINE (HYDROGEN) / AIR FUEL CELL SYSTEM

| MOTOR | WATTS  | GAL./60 MILES/HR. | MPG | RANGE/15 GAL. TANK |
|-------|--------|-------------------|-----|--------------------|
| 8 HP  | 5,967  | 0.138             | 435 | 6525 MILES         |
| 15 HP | 11,186 | 0.259             | 232 | 3480 MILES         |
| 20 HP | 14,914 | 0.349             | 172 | 2580 MILES         |

80% EFFICIENT GASOLINE (HYDROGEN) / AIR FUEL CELL SYSTEM

| MOTOR | WATTS  | GAL./60 MILES/HR. | MPG | RANGE/15 GAL. TANK |
|-------|--------|-------------------|-----|--------------------|
| 8 HP  | 5,967  | 0.172             | 349 | 5235 MILES         |
| 15 HP | 11,186 | 0.323             | 186 | 2790 MILES         |
| 20 HP | 14,914 | 0.431             | 139 | 2085 MILES         |

60% EFFICIENT GASOLINE (HYDROGEN) / AIR FUEL CELL SYSTEM

| MOTOR | WATTS  | GAL./60 MILES/HR. | MPG | RANGE/15 GAL. TANK |
|-------|--------|-------------------|-----|--------------------|
| 8 HP  | 5,967  | 0.229             | 262 | 3930 MILES         |
| 15 HP | 11,186 | 0.431             | 139 | 2085 MILES         |
| 20 HP | 14,914 | 0.575             | 104 | 1560 MILES         |

40% EFFICIENT GASOLINE (HYDROGEN) / AIR FUEL CELL SYSTEM

| MOTOR | WATTS  | GAL./60 MILES/HR. | MPG | RANGE/15 GAL. TANK |
|-------|--------|-------------------|-----|--------------------|
| 8 HP  | 5,967  | 0.345             | 174 | 2610 MILES         |
| 15 HP | 11,186 | 0.647             | 93  | 1395 MILES         |
| 20 HP | 14,914 | 0.862             | 70  | 1050 MILES         |

HYDROCARBON (HYDROGEN)/AIR AEROGEL CATALYZED CARBON ELECTRODE FUEL CELL SYSTEM

BACKGROUND OF THE INVENTION

Fuel cells in which hydrogen gas is used as an anode fuel and air is used as a cathode oxidant is old in the art. Such fuel cells are generically called hydrogen-air fuel cells and operate to convert the chemical energy of the fuel (hydrogen) into electric energy by galvanic action.

In the recent past, special interest has been given to the use of hydrocarbons as a cheap and plentiful fuel for fuel cells. Due to the low energetic characteristics of hydrocarbons, when put to such use, that interest has, prior to my invention, failed to bring any notable beneficial results.

Automobile manufacturers have been directing great attention and efforts towards developing electric vehicles in order to meet state, federal and global air pollution goals and our dependence on imported fossil fuels, it is causing us to rethink our current means of transportation.

As a result of the above, there is an ongoing search for advanced batteries and/or fuel cells for the purpose of generating electric power for electric vehicles, which are light weight, are inexpensive to make and operate and that will, for example, propel an electric vehicle four to five hundred miles per fueling or charge.

To the above end, some interest has been directed to the use of the current automobile gasoline fuel infrastructure system for fuel cell fuels; and thereafter adding ethanol and methanol to said fuel infrastructure system as soon as practical.

The present invention concerns those fuel cells that use a gas as the fuel or oxidant. Such cells have electrodes which provide gas-electrolyte-electrode interfaces. For good cell performance, the electrolyte should penetrate into the electrode sufficiently to reach the interior surfaces of the electrode and thereby contact the gas in as many places as possible in the presence of a noble metal on the electrically-conducting carbon electrode. The ions being formed by the cell reaction should move freely from the reaction zone to and from the electrolyte separator. In fuel cells, the electrodes and the electrolyte should, in theory, maintain a constant balance value, while the fuel and oxidant react and are spent electrochemically, and the electricity and product of reaction are removed from the cell.

In operation, fuel cell catalytic reaction is dependent upon the effective surface area of contact afforded by the noble metal catalysts on the carbon electrodes. Since platinum or other noble metals are very expensive, it is desirable to achieve the greatest surface area of noble metal per unit of material utilized in the electrodes.

The platinum or noble metal of my invention in the high surface area carbon electrode is incorporated by inorganic gels of platinum or other noble metals mixed into an organic gel of resorcinol and formaldehyde. This invention may use any number of nobel metal catalysts, the most useful of which are cobalt, rhodium, iridium, palladium, platinum, silver, gold, ruthenium, and osmium. The choice of a specific catalyst depends mainly on the intended use for the gas electrode.

In accordance with the teachings of my inventions which are the subject matter, U.S. Pat. No. 4,659,634, entitled Methanol Hydrogen Fuel Cell System and issued Apr. 21, 1987, and U.S. Pat. No. 4,684,581, entitled Hydrogen Diffusion Fuel Cell and issued Aug. 4, 1987, it is apparent that hydrocarbons are readily reformed into hydrogen ($H_2$) and carbon dioxide ($CO_2$) gases that can be put to use as fuel. It is easy and economical to produce impure hydrogen-enriched gases by what is commonly called Steam-Hydrocarbon Reforming methods and processes wherein hot vaporous or gaseous mixtures of steam (water) and hydrocarbon are moved into contact with a heated reformer catalyst, such as a porous nickel body in which they react and are reduced to said gases.

The art of making those micro porous materials called aerogels, is old in the art. Aerogels were invented in the 1930s by Samuel S. Kistler. Their manufacture is described in U.S. Pat. No. 2,093,454, issued Sep. 21, 1937 and entitled Method of Producing Aerogels. The manufacture of carbon aerogels is described in U.S. Pat. No. 4,997,804, issued Mar. 5, 1991 and entitled Low Density, Resorcinol-Formaldehyde Aerogels. The manufacture of Resorcinol-Formaldehyde novolacs fibers is described in U.S. Pat. No. 3,650,102, issued Mar. 21, 1972 and entitled Fibers from Novolacs. The manufacture of carbonized fibers for fuel cell electrodes is described in U.S. Pat. No. 3,960,601, issued Jun. 1, 1976 and entitled Fuel Cell Electrode. The manufacture of carbonized fibers for fuel cell electrodes is described in U.S. Pat. No. 3,972,735, issued Aug. 3, 1976 and entitled Method For Making Electrodes For Electrochemical Cells.

The potential use of carbonized aerogels as carriers of catalysts to afford a high surface area in little space, has been alluded to in the teachings of the prior art, but I am unaware of any teachings of the use of such materials in the art of fuel cells.

The use of electrically conductive catalyzed micro porous carbon electrodes in my present invention, composed of carbonized organic gels of resorcinol and formaldehyde mixed with inorganic gels of platinum or other noble metals, is understood and believed to be a new and a meritorious advance in the fuel cell art.

The possible use of aerogels to establish immense catalyzed surface areas in very little space has been alluded to in the teachings of the prior art, but I am unaware of any teaching of the use of such materials in the art of fuel cells. The use of electrically conductive aerogels for fuel cell electrodes in my present invention is thought to be new in the fuel cell art.

OBJECTS AND FEATURES OF MY INVENTION

An object of my invention is to provide a novel hydrocarbon (hydrogen)/air aerogel fuel cell system.

Another object and feature of my invention is to provide a fuel cell system including a micro porous catalytic carbon aerogel cathode (cathogel carbon electrode).

Still another object and feature of my invention is to provide a fuel cell system including a micro porous catalytic carbon aerogel anode (anogel carbon electrode).

Another object and feature of my invention is to provide a fuel cell system including an acid filled micro porous silica aerogel electrolyte separator (cation silicagel separator).

Still another object and feature of my invention is to provide a fuel cell system of the character referred to wherein perfluorinated cation exchange membranes, such as NAFION membranes (made by DuPont), can be used for fuel cell electrode separators.

Another object and feature of my invention is to provide a fuel cell system of the character referred to wherein air (oxygen gas) is used as an oxidant feed stock for the fuel cell cathode.

Yet another object and feature of my invention is to provide a fuel cell system of the character referred to wherein gasoline is used as a feed stock for the production of hydrogen gas for the fuel cell anode fuel.

Still another object and feature of my invention is to provide a fuel cell system of the character referred to wherein hydrocarbons including methanol, ethanol, and alcohol are used, separately or combined, as a feed stock for the production of hydrogen gas for the fuel cell anode fuel.

Still another object and feature of my invention is to provide a fuel cell system of the character referred to wherein the hydrocarbon feed stock including gasoline, methanol, ethanol and/or alcohol are used for the production of a reformed gas composed of hydrogen gas and carbon dioxide gas in a hydrocarbon-steam reformer.

It is an object and feature of my invention to provide a fuel cell system of the character referred to wherein the hydrogen and carbon dioxide gases of the reformed gas are separated from each other by a centrifugal gas-separator device.

Another object and feature of my invention is to provide a fuel cell system and apparatus of the character referred to wherein the fuel cell has high surface area catalyzed carbon electrodes that are made by carbonizing the organic gels of resorcinol and formaldehyde mixed with inorganic gels of platinum or other nobel metals.

Another object and feature of my invention is to provide a fuel cell system and apparatus of the character referred to wherein the fuel cell has high surface area catalyzed carbon electrodes that can operate at high temperatures.

Another object and feature of my invention is to provide a fuel cell system and apparatus of the character referred to wherein the fuel cell has high surface area catalyzed carbon electrodes that achieve greater surface area of noble metal per unit of material utilized in the electrodes than has heretofore been achieved.

Finally, it is an object and feature of my invention to provide a fuel cell system and apparatus of the character referred to wherein the fuel cell has high surface area catalyzed carbon electrodes the structures of which can be integrated with methyl ($CH_3$) groups and converted into hydrophobic carbon aerogel electrodes as required.

The foregoing and other objects and features of my invention will be apparent and will be fully understood from the following detailed description of typical, preferred embodiments of my invention throughout which description reference is made to the accompanying drawings.

DESCRIPTION OF THE DRAWINGS

FIG. 2 is that chemical formula that describes the operation of the steam-hydrocarbon reformer, centrifugal gas separator and the fuel cell system of my invention; and, FIG. 3 is a theoretical computation of gasoline/hydrogen fuel cell efficiency.

DETAILED DESCRIPTION OF THE INVENTION

Figure 1:
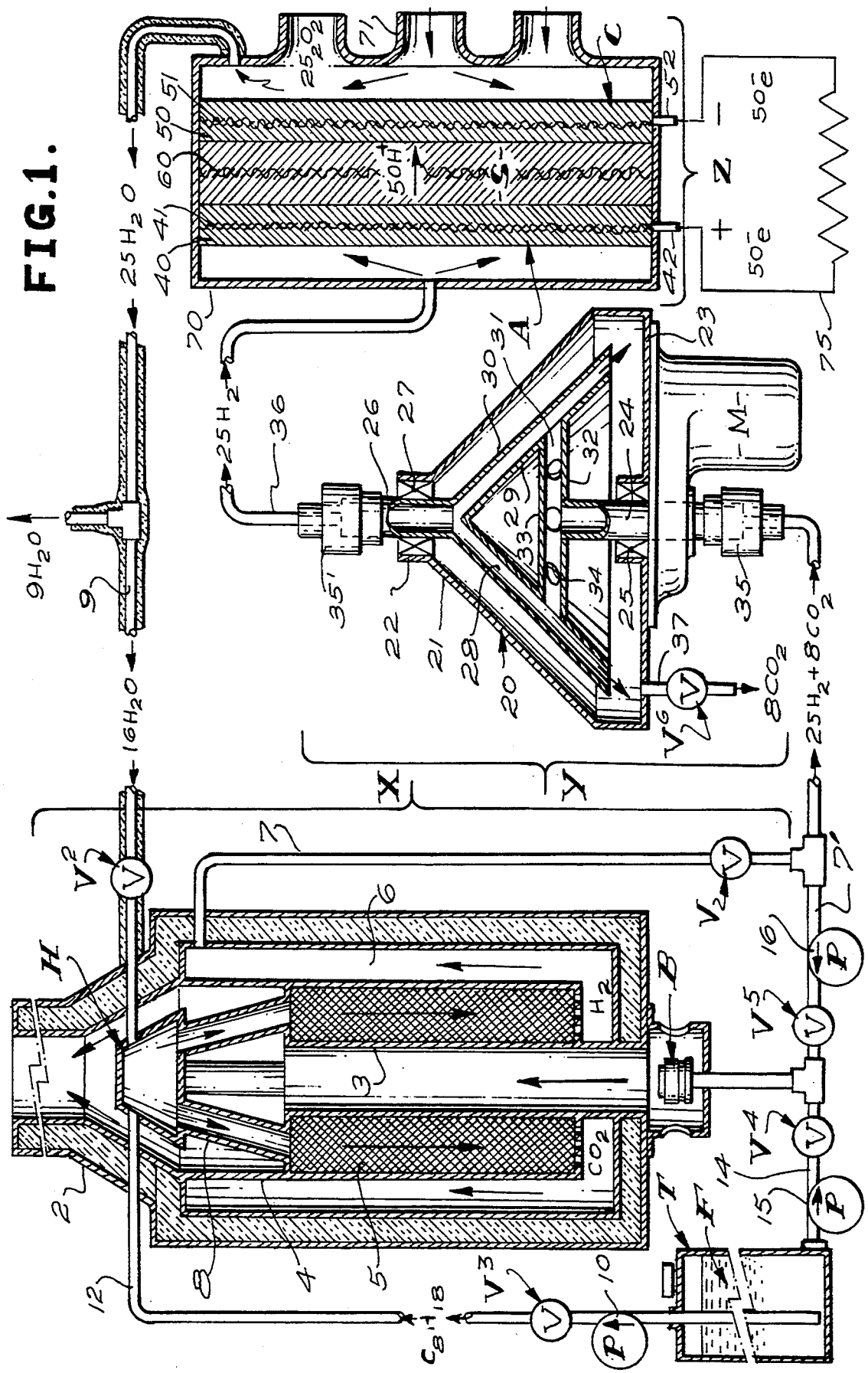
FIG. 1 is a diagrammatic view of a fuel cell system and apparatus embodying my invention.

Referring to FIG. 1 of the drawings, I have diagrammatically illustrated one typical and preferred system embodying my invention. The system illustrated includes a steam-gasoline reformer X, a centrifugal gas separator Y, and a hydrogen-air fuel cell Z. The system also includes a fuel tank T containing fuel F (gasoline); and an air supply (ambient air).

The steam-gasoline reformer X is a device that operates to reform gasoline into hydrogen or hydrogen-enriched gas and carbon dioxide gas by conducting a mixture of gasoline and steam over, across and/or through a catalyst, such as a bed of particulate nickel, at temperatures of in excess of 500° F., less than 1500° F. and preferably at about 1100° F. Such reformer devices are well-known in the art and have long been used to establish hydrogen gas or hydrogen-enriched gas.

To the best of my knowledge, there is no standard make and/or design for steam hydrocarbon reformers. Those reformers which are provided and used throughout the arts are commonly custom fabricated devices made in accordance with old and well established basic principles. It is understood that each such reformer is built to meet the special needs of its user. In the course of being fabricated and put into operation, such reformers are empirically tested to make those adjustments that are or might be required to meet operating requirements.

For full and detailed description and explanation of the operation of steam reformers, reference is made to the teachings of my above-identified U.S. Pat. Nos. 4,659,634 and 4,684,581; and to the published teachings of Robert N. Pease and Paul R. Chesebro in the article Entitled "Equilibrium in Reaction $CH_4 + 2H_2O \rightarrow CO_2 + 4H_2$" in the Journal of American Chemical Society, Volume 50, 1464 (May, 1928); and further, to the published teachings of W. Akers and D. P. Camp of Rice Institute of Houston, Tex. entitled "Kinetics of the Methane-Steam Reaction" in American Institute of Chemical Engineers Journal, Volume 1, No. 4, page 471 (December, 1955).

The gasoline steam reformer X shown in FIG. 1 of the drawings is illustrative of that reformer that I fabricated for use when reducing my invention to practice. The reformer X was fabricated in accordance with the basic teachings of above-noted patents and publications. The reformer X includes an elongate vertical external housing with a cylindrical side wall and with top and bottom walls. An elongate vertical chimney 2 extends up from the top wall of the housing. The housing and chimney are shown as a unitary heat-insulated structure. They can be established of a suitable sheet metal and surrounded by a suitable heat-insulating jacket. An elongate vertical draft tube 3 extends upwardly from the bottom wall of the housing and opens upwardly therein, toward the lower end of the chimney 2. An elongate vertical cylindrical casing 4 depends from the top wall of the housing and is in radial spaced relationship between the side wall thereof and the draft tube. The casing 4 cooperates with the draft tube 3 to define an annulus in which a reactor catalyst 5 of particulate nickel or other suitable catalytic material(s) is contained. The upper and lower ends of the annulus defined by the casing and the draft tube are closed by annular horizontal walls which are suitably perforated and/or ported to allow for the entry and exit of gases into and from the annulus and from within the reactor catalyst. The casing cooperates with the side wall of the housing to define a reformed gas collecting chamber 6.

A reformed gas delivery line 7, with an adjustable flow metering valve V connected therein, extends between the upper portion of the chamber 6 and the centrifugal gas separator Y and conducts reformed gas from the reformer next to the separator.

The reformer next includes a pre-heater H to preheat water and gasoline within the reformer. The pre-heater H is shown as including a canister positioned within the lower portion of the chimney and above the draft tube and a plurality of heating tubes 8 extending between the canister and the upper end of the annulus in which the catalyst 5 is contained.

Water (water vapor or steam) generated in the fuel cell Z as a byproduct of fuel cell reaction is delivered from the fuel cell to the pre-heater H through a water line 9 that extends from the fuel cell to the reformer, substantially as shown. The line 9 is provided with a flow metering valve $V^2$ and is preferably insulated to conserve heat.

Gasoline (hydrocarbon) fuel F is delivered to the pre-heater H through a line 12 extending between the pre-heater and the fuel tank T. A pump 10 and an adjustable metering valve $V^3$ are engaged in the line 12 to move and control the flow of gasoline therethrough.

Finally, the reformer X includes a heater or burner B at the lower end of the housing and below the draft tube 3. The burner is within a burner box that protects it and provides it with adequate combustion air.

The burner B is fueled with gasoline or is fueled with hydrogen gas as circumstances and/or operating conditions dictate and/or permit.

During "start-up" of the system, that is, when the system is being put into operation, gasoline is used to fuel the burner. The gasoline is moved through a line 14 extending from the fuel tank T to the burner. The gasoline is moved through the line 14 by a pump 15 in the line and its flow rate is controlled by an adjustable flow metering valve $V^4$ in the line, downstream from the pump.

When the system is operating, the burner can be fueled with hydrogen gas, hydrogen-enriched reformed gas generated in the reformer is used. The reformed gas is delivered to the burner through a branch line 7' extending between the line 7 and the burner. A pump 16 engaged in line 7' to move the gas through that line and an adjustable flow metering valve $V^5$ is engaged in the line 7' downstream from the pump to control the rate of flow of the reformed gas.

The burner is operable to generate sufficient heat to heat the catalyst 5 pre-heater H and the fluids and gases therein to a desired and effective operating temperature. Under ordinary conditions, the operating temperature within the reformer is approximately 1100° F.

The centrifugal gas separator Y, which I have diagrammatically illustrated in FIG. 1 of the drawings, can vary widely in design and construction without in any way affecting my invention. As shown in the drawings, the gas separator Y includes an elongate vertical case 20 having a side wall 21 with a cylindrical lower portion and an upwardly and inwardly tapered conical upper portion; a cylindrical top wall 22 and a flat bottom wall 23. An elongate vertical reformed gas inlet tube is arranged centrally of the case and extends vertically and freely through a central opening in the bottom wall thereof. The tube 24 is rotatably supported by a lower bearing 25 that is mounted in the central opening in the bottom wall of the case. An elongate vertical hydrogen outlet or delivery tube 26 extends freely and vertically through an opening in the top wall 22 of the case and is rotatably carried by an upper bearing 27 mounted within the cylindrical top wall of the case. The lower end of the delivery tube 26 communicates with the upper end of a downwardly and radially outwardly inclined gas-separating chamber 28 within a rotor head within the case and that includes radially spaced inwardly and upwardly inclined or tapered inner and outer cone sections or parts 29 and 30. The lower annular end of the chamber 28 opens into the case. Reformed gas is conducted from the upper end of the inlet tube 24 into the separating chamber 28, between the upper and lower ends thereof, through a transfer chamber 31 defined by a flat horizontal annular lower plate 32 that is fixed to and extends between the upper end of the tube 24 and the inner cone section or part 27 and by a flat horizontal upper plate 33 spaced above the plate 32 and that is fixed to the cone section 27, substantially as shown. Communication between the chambers 28 and 31 is established by a plurality of ports 34 in that portion of the cone section 29 that defines the outer perimeter of the chamber 31.

The plate 32 establishes rotary driving engagement between the inlet tube 24 and the inner cone part 29 and rotary driving engagement between the inner and outer cone parts 29 and 30 is established by circumferentially spaced radially extending spiders (not shown) extending between the parts 29 and 30.

The tubes 24 and 26, cone sections or parts 29 and 30 and the plates 32 and 33 establish a rotor assembly, within the case 20 into which reformed gas from the reformer X is conducted; from which the carbon dioxide gas is delivered into the case, for disposal; and, from which hydrogen gas is delivered. The assembly is rotated at high speed by an electric motor drive means M that is shown carried by the bottom wall 23 of the case and that is drivingly engaged with and about the lower inlet tube 24, substantially as shown.

The lower end of the reformed gas inlet tube 24 is connected with the downstream end of line 7 by a suitable gas sealed rotary coupling 35. The upper end of the hydrogen gas outlet tube 26 is connected with a hydrogen gas delivery line 36 by a similar gas sealed rotary coupling 35'.

Finally, the separator Y has a carbon dioxide gas waste line 37 connected to the bottom wall thereof and in which an adjustable flow control valve $V^6$ is engaged.

When in use, the rotary assembly of the separator Y is rotated at high speed and reformed gas is conducted into it from line 7. The reformed gas flows up through the tube 24 into the chamber 31 where it is cast radially outward and into the central portion (between the top and bottom) of the separator chamber 28. The heavier carbon dioxide gas is cast radially outward onto the outer cone section 30 and is advanced downwardly relative thereto and from the lower open end of chamber 28 by centrifugal force. The carbon dioxide gas is conducted from within the case, to waste, through the line 37. The lighter hydrogen gas which is nominally affected by the centrifugal forces encountered within the separator is displaced (squeezed) from within and by the carbon dioxide gas and, following its least course of resistance, escapes upwardly in the chamber 28 and thence out of the rotor assembly through tube 26 and into the hydrogen delivery line 36.

The hydrogen fuel cell Z diagrammatically illustrated in FIG. 1 of the drawings is a gasoline hydrogen-/air fuel cell and includes a micro porous catalyzed carbon aerogel anode A, a catalytic aerogel cathode C spaced from the anode A and an acid electrolyte filled micro porous silica hydrogel; separator S between the anode A and cathode C.

As will be described in the following, the anode A and cathode C include and are characterized by aerogel-like bodies having skeletal structures (skeletons) of electrically conductive carbon, the surfaces of which are impregnated or infused with a suitable catalytic metal, such as platinum. Accordingly, the anode and cathode electrodes A and C are appropriately referred to as catalyzed carbon aerogel electrodes.

The catalyzed carbon aerogel anode A and the catalyzed carbon aerogel cathode C include aerogel bodies 40 and 50 that are made as follows:

(1) Mixing the inorganic and organic sols for the electrode

The catalytic carbon electrodes are made by mixing an aqueous solution of inorganic sol of platinum or other noble metals with an aqueous solution of organic sol of resorcinol in formaldehyde and using an aqueous base solution as a catalyst. The concentration of sols and base solution are regulated to establish desired anode and cathode pore sizes. The concentration of sols to be used according to the present invention is determined by electrode surface area requirements. It might be noted that in more concentrated solutions, the particles are closer together and a more dense gel network (skeleton) is established. More open gels are prepared by gelling the product at lower concentrations. The organic sol concentration is about 3 to 30 grams of solids per 100 milliliters of gel volume. The inorganic sol concentration is about 0.01 to 0.05 grams of solids per 100 milliliters of gel volume. A typical inorganic and organic sols may contain 0.01 grams of platinum sulfide PtS, 10 grams organic monomer resorcinol $C_6H_4(OH)_2$, and 5 grams formaldehyde HCHO of solids per 100 milliliters of gel volume.

(2) Gelling the inorganic and organic electrode sols into hydrogels

The gelling step can be most effectively brought about by the addition of an aqueous base solution, such as sodium carbonate, sodium sulfate, potassium chloride, ammonium nitrate, and others, in the range of 6.5–9.1 pH at a temperature range of from 80°–120° C. for a period of 24–168 hours in a sealed container. The inorganic and organic hydrogels groups are cast in thin sheet form into the electrical conductor screens 41 and 51 within a form established of glass or other suitable material. It is then placed in sealed container. Sols containing less surface area per unit volume require a longer time to gel or may require higher temperatures in order to bring about gelling within a practical period of time.

(3) Solvent exchange within the inorganic and organic hydrogel electrode

The solution water in the pores of the inorganic and organic hydrogels are exchanged with or replaced with acetone by diffusion by means of fresh agitated organic acetone solvent bath at a temperature range of 40°–50° C. for 48–96 hours.

(4) Carbon dioxide drying the inorganic and organic hydrogel electrode

The inorganic and organic hydrogels electrodes in the glass forms are placed in a pressure vessel and filled with liquefied carbon dioxide at 900 psi at a temperature of 14° C. and allowed to stand in the liquefied carbon dioxide for four hours and then drained from the pressure vessel to a level just above the inorganic and organic hydrogels in their glass forms and then refilled with carbon dioxide. This drain/refill is preferably conducted four times a day for three days. In practice, the acetone solution in the pores of the inorganic-organic gels is exchanged with or replaced by diffusion with liquefied carbon dioxide. Then the electrodes in the vessel are subjected to high pressure that transforms the carbon dioxide $CO_2$ into a supercritical fluid (temperature $T=31°$ C., critical pressure $p_c=74$ bar). Above the critical temperature no gas can be liquefied, regardless of how great the pressure. As the temperature rises the liquid is not allowed to evaporate to a volume or level where the electrode gel is exposed. When the critical temperature is passed, the liquid is transformed into a gas and the hydrogel electrode becomes an aerogel electrode. Slow removal of the gas prevents disruption of the skeletal structure of the aerogel and leaves it in an expanded condition.

(5) Carbonizing the dried inorganic and organic aerogel electrode

The inorganic and organic aerogel electrodes are removed from their glass forms and are carbonized in an oven at 800°–1200° C. in an atmosphere of nitrogen gas; to complete establishing the catalyzed carbon gas electrodes A & C.

(6) Hydrophobic treatment of the hydrophilic carbon electrodes

These carbon aerogel electrodes are highly hydropholic and can, if necessary or desired, be integrated with methyl ($CH_3$) groups to convert them into hydrophobic electrodes.

The acid electrolyte filled micro porous silica hydrogel separator is a micro porous structure made by a mixture of tetraethyl orthosiliate $Si(OC_2H_5)_4$ and alcohol that is condensed in thin sheet form in and about a glass fabric or screen 60. An acid catalyst is added to the hydrogel and Si—OH groups pair up to establish an Si—O—Si bond aggregate silica skeleton structure, immersed in a mixture of water and alcohol. The water and alcohol in the hydrogel is exchanged with an acid electrolyte by a suitable washing process. Acids that might be advantageously used include hydrochloric acid $H^+(aq)+CL^-(aq)$; sulfuric acid $H^+(aq)+(aq)+HSO_4^-(aq)$; phosphoric acid $3H^+(aq)+PO_4^-(aq)$; and, nitric acid $H^+(aq)+NO_3^-(aq)$.

The fuel cell using the acid electrolyte filled silica micro porous hydrogel separator S is operated as a starved electrolyte system wherein the amount of electrolyte present does not completely saturate the porous component. Consequently, the electrolyte distribution is affected both by the transport phenomena introduced by the presence of a current flowing in the cell and by the competition of the porous components for the available electrolyte.

The cation separator in my new fuel cell might be in the form of a NAFION (a DuPont product) membrane cation separator established of perfluorinated cation exchange membranes without departing from the broader aspects of my invention.

When the catalyzed carbon aerogel gas anode electrode A and the catalyzed carbon aerogel gas cathode electrode C are positioned at the sides of the separator S, surface tension forces in the capillary pores of electrodes A and C are so great that the electrolyte is drawn into and penetrates the electrodes sufficiently to coat the interior surfaces of the electrodes with electrolyte and thereby establishes the gas-electrolyte-electrode interface reaction zone sites within the electrodes.

The fuel cell Z includes a suitable case 70 in which the anode and cathode electrodes A and C and the separator S are positioned and retained, substantially as shown in FIG. 1 of the drawings. The hydrogen gas delivery line 36 extending from the separator Y is connected with the case to deliver hydrogen gas to the anode electrode A; an air supply means 71 is provided to supply oxygen from ambient air to the cathode and the line 9 extending from the reformer X is connected with the case to conduct water produced in the cell by fuel cell reaction to the reformer.

The terminal posts 42 and 52 on the collector screens 41 and 51 are connected with a suitable external electric circuit 75, as diagrammatically indicated in the drawings.

OPERATION OF THE FUEL CELL SYSTEM

In operation of my invention, the reformer X is first heated to an effective operating temperature by means of the burner B thereof. A temperature of about 1100° F. is preferred. Water ($H_2O$) (which is a by-product of fuel cell reaction in the cell Z) is conducted through line 9 and fed in the pre-heater H of the reformer X. As a result of heat generated in the cell Z during operation thereof, the water ($H_2O$) leaves the cell and enters the pre-heater in the form of steam or vapor.

The water ($H_2O$) delivered into the pre-heater H of the reformer X is heated therein to the operating temperature of the reformer X. The gasoline ($C_8H_{18}$) in fuel tank T is conducted by means of the pump 10 to the pre-heater H through line 12 where it is heated and combined with the water or steam in the pre-heater H. The heated and combined gasoline and steam is conducted from the pre-heater H into the reactor catalyst 5. Upon moving through the reactor catalyst, the combined gasoline and steam react and are discharged into chamber 6 of the reformer as a mixture of hydrogen ($H_2$) and carbon dioxide ($CO_2$) gases, called reformed gas.

As previously described, during operation of my invention, liquid gasoline is moved from fuel tank T (as a start-up fuel) to the burner B by means of the pump 15 and is burned, or reformed gas (hydrogen ($H_2$) and carbon dioxide ($CO_2$) gas fuel is moved to the burner B through line 7' by means of the pump 16 and is burned. The fuel is mixed with air at the burner B and is ignited to burn below and within the lower end portion of the draft tube 3. The hot gases generated by the combustion of the fuel heats the catalyst 5 and the pre-heater H.

When in use, adjustment of the operation of the reformer X to produce a usable supply of hydrogen and hydrogen-enriched gas is quickly attained by adjusting certain of the flow rate control valves V, $V^1$, $V^2$, $V^3$, and $V^4$ in accordance with simple empirical testing procedures.

The theoretical overall chemical reaction of the reformer and gas separator to reform gasoline and steam to separated hydrogen gas and carbon dioxide gas is set forth in FIG. 2 of the drawings.

Attention is next directed to the operation of the centrifugal gas separator Y as shown in FIG. 1 of the drawings.

Reformed gas is conducted from the reformer X through line 7 to the lower inlet tube 24 of the separator Y. The reformed gas enters and flows through the tube 24 into and through the distributor chamber 31 and thence into and through the separating chamber 28 of the rapidly rotating rotor assembly of the separator Y. The carbon dioxide ($CO_2$) gas which is denser (1.975 grams per liter) than the hydrogen gas is cast outwardly against the inside surface of the outer cone section 30 and is caused to move down through and out of the lower open end of the chamber 28 and into the case, by centrifugal force. The reformed hydrogen gas ($H_2$) which is less dense (0.0899 grams per liter) than the carbon dioxide gas is displaced from within and by the carbon dioxide and moves upward and inward in the chamber 28 to the upper outlet tube 26 and is conducted from the separator Y through the delivery line 36 to the fuel cell Z.

Next, as shown and set forth in FIGS. 1 and 2 of the drawings, attention is directed to the operation of the hydrogen fuel cell Z. The anode fuel for the fuel cell Z is hydrogen gas ($H_2$) flowing from the separator Y through line 36. The hydrogen gas is delivered to the surface of the catalyzed carbon aerogel anode A of the cell Z. The anode fuel hydrogen gas (25 $H_2$) reacts at the anode A and results in the generating of 50 hydrogen ions (50 $H^+$) and 50 free electrons (50 $e^-$). The 50 hydrogen ions (50 $H^+$) move through the electrolyte separator S. Oxygen (from the air) 25/2 $O_2$ is used to oxidize the catalyzed carbon aerogel cathode C of the fuel cell. In the cathode reaction as shown in FIG. 2 of the drawings, the 50 free electrons (50 $e^-$) given up by the anode 27 move through the external circuit 75 and collect on the surfaces of the cathode C. The electrons within the cathode C react with the oxygen (from the air) 25/2 $O_2$ and the 50 hydrogen ions (50 $H^+$) to form water (25 $H_2O$) at the cathode electrode C.

The pathway for the directional flow of the hydrogen ions ($H^+$) through the electrolyte separator S of the cell Z can be considered the internal circuit of the cell and the pathway for the flow of electrons ($e^-$) can be considered the external circuit of the fuel cell.

Also, in FIG. 3 of the drawings, I have set forth the theoretical weights or amounts of products and reactants used in carrying out my invention. I start with one gallon of gasoline ($C_8H_{18}$) as a base line and 2.53 gallons of water ($H_2O$) from fuel cell Z reaction is fed into the steam-gasoline reformer X; and its products of reaction are 20.35 pounds of carbon dioxide gas ($CO_2$) and 2.89 pounds of hydrogen-rich feed gas ($H_2$).

Next, the 20.35 pounds of carbon dioxide gas (8 $CO_2$) and 2.89 pounds of hydrogen-rich feed gas (25 $H_2$) are separated from each other by the centrifugal force gas separator Y as shown in FIG. 1. Then the 2.89 pounds of hydrogen feed gas (25 $H_2$) is used (by reaction in the fuel cell Z anode electrode A) reaction to generate hydrogen ions (50 $H^+$) and free electrons (50 $e^-$). The hydrogen ions and free electrons together with 23.12 pounds of oxygen (25/2 $O_2$) (from the air) react at the cathode C to produce 3.95 gallons of water (25 $H_2O$). Therefore the total waste reactions of the fuel cell system are 1.42 gallons of water (9 $H_2O$) and 20.35 pounds of carbon dioxide gas (8 $CO_2$).

Therefore, as shown in FIG. 3 of the drawings, in utilizing my new fuel system, the maximum amount of useful work from one gallon of gasoline ($C_8H_{18}$), using a 100% efficiency theoretical model is 43,242 watt hours. Unfortunately, not all the power from the fuel cell comes out as useful electric power for performing desired work. The loss of some power is caused by heat in fuel cells, combustion and thermal inefficiencies in reformer X, chemical reaction losses, fuel cell internal resistance losses, etc. Therefore, the power output of the fuel cell system is equal to the theoretical power minus all the power losses, and efficiency is dependent upon how well the theoretical power is converted to watt hours output.

Having described only one typical preferred structural embodiment of my invention and the functional aspects and/or mode of operation thereof, I do not wish to be limited to the specific details herein set forth but wish to reserve to myself any modifications and/or variations that might appear to those skilled in the art and which fall within the scope of the following claims.

Having described my invention, I claim:

1. A fuel cell system comprising a hydrocarbon fuel supply; a water supply; a steam-hydrocarbon fuel catalytic reformer receiving hydrocarbon fuel from the fuel supply and water from the water supply and delivering reformed gas of hydrogen and carbon dioxide; a reformed gas separator receiving reformed gas from the reformer and operating to separate the hydrogen and carbon dioxide gas thereof and separately delivering hydrogen and carbon dioxide gases; a hydrogen fuel cell including a micro porous catalyzed carbonized aerogel anode electrode fed with hydrogen gas delivered by the separator, a micro porous catalyzed carbonized aerogel cathode fed with oxygen from ambient air and a acid electrolyte cation filled silica hydrogel separator between the anode and cathode; and, an external circuit connected with and between the anode and cathode electrodes.

2. The fuel cell system set forth in claim 1 wherein fuel cell reaction within the fuel cell generates water supplied to the reformer.

3. The fuel cell system set forth in claim 1 wherein the reformer includes a burner fueled with hydrocarbon fuel from the fuel supply, a pre-heater heated by the burner and receiving and heating the hydrocarbon fuel and water received by the reformer and a catalyst bed heated by the burner and receiving hydrocarbon fuel and water from the pre-heater and reforming it to said reformed gas for delivery by the reformer.

4. The fuel cell system set forth in claim 1 wherein the reformer includes a burner fueled with reformed gas delivered by the reformer, a pre-heater heated by the burner and receiving hydrocarbon fuel and water delivered to the reformer and a catalyst bed heated by the burner and receiving hydrocarbon fuel and water heated from the pre-heater and generating reformed gas for delivery by the reformer.

5. The fuel cell system set forth in claim 1 wherein the reformer includes a burner selectively receiving hydrocarbon fuel from the fuel supply and reformed gas delivered by the reformer, a pre-heater heated by the burner and receiving hydrocarbon fuel and water delivered to the reformer and a catalyst bed heated by the burner and receiving hydrocarbon fuel and water and reforming it to said reformed gas for delivery by the reformer.

6. The fuel cell system set forth in claim 1 wherein the micro porous catalyzed carbonized aerogel anode and cathode electrodes include micro porous reticulated gas permeable and electrically conductive carbon skeletons with a noble metal catalyst at the surfaces thereof.

7. The fuel cell system set forth in claim 1 wherein the micro porous catalyzed carbonized aerogel anode and cathode electrodes include porous reticulated gas permeable and electrically conductive carbon micro porous skeletons with a noble metal catalyst at the surfaces thereof; the skeletons of the anode and cathode electrodes are formed in and about metal conductor screens having terminal posts with and between which the external circuit is connected.

8. The fuel cell system set forth in claim 1 wherein the micro porous catalyzed carbonized aerogel anode and cathode electrodes include porous reticulated gas permeable electrically conductive carbon skeletons with a noble metal catalyst at the surfaces thereof and established by super-critically drying and firing an aqueous gel of polymerized organic monomer resorcinol in formaldehyde and an aqueous solution of nobel metal salt together with a sol of sodium carbonate and in which the water in the pores of the skeletons is replaced with liquid carbon dioxide preparatory to and during firing.

9. A fuel cell system comprising a fuel cell having spaced apart anode and cathode electrodes established of micro porous reticulated carbon bodies with noble metals at the surfaces thereof; an electrolyte separator in contacting engagement with and between the anode and cathode electrodes and including an acid electrolyte filled micro porous body of silica hydrogel; and external electric circuit connected with and between the anode and cathode electrodes; an oxygen supply delivering oxygen to the cathode electrode; and, a hydrogen gas supply means delivering hydrogen gas to the anode electrode; the micro porous reticulated carbon bodies of the anode and cathode and the noble metal at the surfaces thereof are thermally reduced organic aerogels having predetermined pore size and infused with a noble metal salt.

10. The fuel cell system set forth in claim 9 wherein the hydrogen supply means includes a hydrocarbon fuel supply, a water supply means, a steam-hydrocarbon reformer including a heat-generating burner, a pre-heater heated by the burner and through which hydrocarbon fuel and water received from the fuel and water supplies are moved, a catalyst bed heated by the burner and receiving hydrocarbon fuel and water from the pre-heater and delivering a reformed gas of hydrogen and carbon dioxide; a gas separator receiving reformed gas from the reformer and separating the hydrogen and carbon dioxide gases thereof and delivering the hydrogen gas to the anode electrode of the fuel cell; the oxygen supply includes means conducting ambient air to the cathode electrode of the fuel cell.

* * * * *